(12) United States Patent
Doshi et al.

(10) Patent No.: US 10,548,033 B2
(45) Date of Patent: Jan. 28, 2020

(54) LOCAL PORTABLE TEST SYSTEMS AND METHODS

(71) Applicant: w2bi, Inc., South Plainfield, NJ (US)

(72) Inventors: Dinesh Doshi, South Plainfield, NJ (US); Mark Elston, San Jose, CA (US); Amit Kucheriya, South Plainfield, NJ (US); Derek Diperna, Medford Lakes, NJ (US); Vipul Jain, South Plainfield, NJ (US); Liqun Liu, South Plainfield, NJ (US); Ira Leventhal, San Jose, CA (US)

(73) Assignee: w2bi, Inc., South Plainfield, NJ (US)

( * ) Notice: Subject to any disclaimer, the term of this patent is extended or adjusted under 35 U.S.C. 154(b) by 0 days.

(21) Appl. No.: 15/236,326

(22) Filed: Aug. 12, 2016

(65) Prior Publication Data
US 2018/0049052 A1    Feb. 15, 2018

(51) Int. Cl.
*H04B 17/00*    (2015.01)
*H04W 24/06*    (2009.01)
*H04W 24/02*    (2009.01)
*H04W 88/08*    (2009.01)

(52) U.S. Cl.
CPC .......... *H04W 24/06* (2013.01); *H04W 24/02* (2013.01); *H04W 88/08* (2013.01)

(58) Field of Classification Search
CPC ..... H04W 24/06; H04W 24/02; H04W 84/18; H04W 88/08
USPC ..................................................... 455/67.12
See application file for complete search history.

(56) References Cited

U.S. PATENT DOCUMENTS

| | | | |
|---|---|---|---|
| 3,082,374 A | 3/1963 | Buuck | |
| 6,308,065 B1 | 10/2001 | Molinari et al. | |
| 6,522,995 B1 | 2/2003 | Conti et al. | |
| 7,810,001 B2 | 10/2010 | Zhou et al. | |
| 7,889,663 B1 | 2/2011 | Wright et al. | |
| 8,054,221 B1 | 11/2011 | Luong et al. | |
| 8,283,933 B2 * | 10/2012 | Dasnurkar | G01R 29/26 324/555 |
| 8,310,385 B2 * | 11/2012 | Dasnurkar | H03M 1/1095 341/120 |
| 8,325,614 B2 * | 12/2012 | Poon | H04W 4/70 370/241 |

(Continued)

FOREIGN PATENT DOCUMENTS

WO    2013192118    12/2013

*Primary Examiner* — April G Gonzales (57) ABSTRACT

In one embodiment, a test system comprises: a network access point simulation component configured to simulate network access point operations and to simulate test interactions with user equipment, and a local control component configured to direct the network access point simulation component and to control test interactions with the user equipment. The number of devices under test included in the user equipment and distinct network access points that are coincidentally simulated are variable. In one exemplary implementation, the local control component comprises a test executive operable to direct simulation of communication network operations and the test interactions in accordance with information received from the remote control components. The network access point simulation component and local control component are portable.

19 Claims, 8 Drawing Sheets

(56) References Cited

U.S. PATENT DOCUMENTS

| | | | |
|---|---|---|---|
| 8,433,953 B1* | 4/2013 | Gaudette | G06F 11/263 702/123 |
| 8,577,813 B2 | 11/2013 | Weiss | |
| 8,737,980 B2 | 5/2014 | Doshi et al. | |
| 8,781,797 B1 | 7/2014 | Oltman et al. | |
| 8,793,117 B1 | 7/2014 | Varshney et al. | |
| 8,856,539 B2 | 10/2014 | Weiss | |
| 8,983,394 B2* | 3/2015 | Deforge | H04B 17/0085 455/67.11 |
| 9,065,556 B2* | 6/2015 | Popescu | H04B 17/0085 |
| 9,100,826 B2 | 8/2015 | Weiss | |
| 9,116,873 B2* | 8/2015 | Majumdar | G06F 11/3433 |
| 9,185,675 B2* | 11/2015 | Chen | H04W 64/00 |
| 9,253,242 B2* | 2/2016 | Macalet | H04L 65/80 |
| 9,446,519 B2 | 9/2016 | Gray et al. | |
| 9,469,037 B2 | 10/2016 | Matthews et al. | |
| 9,481,084 B2 | 11/2016 | Park | |
| 9,530,137 B2 | 12/2016 | Weiss | |
| 9,544,910 B2* | 1/2017 | Delsol | H04W 24/06 |
| 9,596,166 B2* | 3/2017 | Iyer | H04L 43/50 |
| 9,652,077 B2 | 5/2017 | Jenkinson | |
| 9,948,411 B2 | 4/2018 | Diperna et al. | |
| 9,959,181 B2 | 5/2018 | Hittel et al. | |
| 9,973,416 B2 | 5/2018 | Henry et al. | |
| 10,003,418 B1 | 6/2018 | Yellapantula et al. | |
| 10,020,899 B2 | 7/2018 | Diperna et al. | |
| 10,025,883 B2 | 7/2018 | Paule et al. | |
| 2002/0116507 A1 | 8/2002 | Manjure et al. | |
| 2004/0012529 A1* | 1/2004 | Teshirogi | G01R 29/0821 343/702 |
| 2004/0214564 A1* | 10/2004 | Rosen | H04W 24/00 455/423 |
| 2005/0083068 A1* | 4/2005 | Clarridge | G01R 31/026 324/601 |
| 2005/0222690 A1* | 10/2005 | Wang | H04M 1/24 700/17 |
| 2006/0229018 A1* | 10/2006 | Mlinarsky | H04B 7/0413 455/67.11 |
| 2006/0282736 A1* | 12/2006 | Schroth | G01R 31/3183 714/742 |
| 2007/0281684 A1 | 12/2007 | Parmar et al. | |
| 2008/0081608 A1 | 4/2008 | Findikli et al. | |
| 2008/0263410 A1 | 10/2008 | Mittal et al. | |
| 2008/0313313 A1 | 12/2008 | Doshi et al. | |
| 2009/0112505 A1 | 4/2009 | Engel et al. | |
| 2009/0249284 A1 | 10/2009 | Antosz et al. | |
| 2009/0265035 A1 | 10/2009 | Jenkinson et al. | |
| 2009/0312009 A1* | 12/2009 | Fishel | H01Q 1/241 455/425 |
| 2010/0083045 A1* | 4/2010 | Qiu | H04L 43/50 714/27 |
| 2010/0113011 A1 | 5/2010 | Gregg et al. | |
| 2010/0240317 A1 | 9/2010 | Giles et al. | |
| 2011/0025337 A1 | 2/2011 | Morrow et al. | |
| 2011/0047428 A1* | 2/2011 | Kikta | G06F 11/263 714/733 |
| 2011/0151863 A1 | 6/2011 | Shaw et al. | |
| 2011/0178766 A1 | 7/2011 | York et al. | |
| 2011/0275364 A1* | 11/2011 | Austin | H04L 41/06 455/423 |
| 2011/0293840 A1 | 12/2011 | Newkirk et al. | |
| 2011/0294470 A1* | 12/2011 | Pasquero | H04B 1/3888 455/412.2 |
| 2012/0041745 A1* | 2/2012 | Spilman | G06F 11/261 703/13 |
| 2012/0131515 A1 | 5/2012 | Rice | |
| 2012/0139571 A1 | 6/2012 | Nickel et al. | |
| 2012/0146956 A1 | 6/2012 | Jenkinson | |
| 2012/0280934 A1 | 11/2012 | Ha et al. | |
| 2012/0282891 A1* | 11/2012 | Mohammed | H04L 63/0428 455/406 |
| 2012/0300649 A1 | 11/2012 | Parmar et al. | |
| 2013/0065575 A1* | 3/2013 | Poon | H04W 4/70 455/418 |
| 2013/0078983 A1 | 3/2013 | Doshi et al. | |
| 2013/0090881 A1 | 4/2013 | Janardhanan et al. | |
| 2013/0183898 A1 | 7/2013 | Strid | |
| 2013/0227348 A1 | 8/2013 | Stephenson et al. | |
| 2013/0294255 A1 | 11/2013 | Olgaard et al. | |
| 2013/0331080 A1* | 12/2013 | Poon | H04W 4/70 455/418 |
| 2013/0338958 A1* | 12/2013 | Shanishchara | G01C 25/00 702/116 |
| 2013/0345864 A1 | 12/2013 | Park | |
| 2014/0111484 A1 | 4/2014 | Welch et al. | |
| 2014/0122009 A1* | 5/2014 | Meiyappan | H04B 17/0085 702/104 |
| 2014/0242986 A1* | 8/2014 | Poon | H04W 4/70 455/435.1 |
| 2014/0305224 A1 | 10/2014 | Zhang et al. | |
| 2014/0321303 A1* | 10/2014 | Iyer | H04L 43/50 370/252 |
| 2014/0379935 A1 | 12/2014 | Venkatasubramaniam et al. | |
| 2014/0380253 A1 | 12/2014 | McLaughlin | |
| 2015/0003505 A1 | 1/2015 | Lusted et al. | |
| 2015/0024720 A1* | 1/2015 | Efrati | H04W 12/02 455/414.1 |
| 2015/0126132 A1* | 5/2015 | Chung | H04B 1/3827 455/67.14 |
| 2015/0297991 A1 | 10/2015 | Mahlmeister et al. | |
| 2015/0327088 A1* | 11/2015 | Makhlouf | H04W 24/06 370/253 |
| 2016/0044520 A1* | 2/2016 | Iyer | H04W 24/08 370/252 |
| 2016/0087856 A1* | 3/2016 | Groenendijk | H04L 41/5009 370/242 |
| 2016/0134737 A1 | 5/2016 | Pulletikurty | |
| 2016/0187876 A1 | 6/2016 | Diperna et al. | |
| 2016/0187877 A1 | 6/2016 | Diperna et al. | |
| 2016/0192213 A1 | 6/2016 | Diperna et al. | |
| 2016/0255192 A1* | 9/2016 | Poon | H04W 4/70 455/435.1 |
| 2016/0320889 A1 | 11/2016 | Jenkinson | |
| 2016/0337053 A1 | 11/2016 | Diperna et al. | |
| 2017/0052527 A1 | 2/2017 | Dougherty et al. | |
| 2017/0156073 A1* | 6/2017 | Liu | G06F 3/03545 |
| 2018/0024847 A1* | 1/2018 | Campbell | G06F 9/453 715/708 |
| 2018/0048555 A1 | 2/2018 | Doshi et al. | |
| 2018/0049050 A1 | 2/2018 | Doshi et al. | |
| 2018/0049051 A1 | 2/2018 | Doshi et al. | |
| 2018/0049052 A1 | 2/2018 | Doshi et al. | |
| 2018/0049054 A1 | 2/2018 | Dosi et al. | |
| 2018/0268378 A1 | 9/2018 | Liu et al. | |
| 2018/0316443 A1 | 11/2018 | Diperna et al. | |
| 2019/0020423 A1* | 1/2019 | Diperna | H04B 17/11 |

* cited by examiner

LOCAL PORTABLE TEST SYSTEMS AND METHODS

RELATED APPLICATIONS

This application is related to the following U.S. patent applications, all of which are incorporated herein by reference in their entirety:

Co-pending application Ser. No. 15/236,315 filed Jun. 12, 2016 entitled "Automated Configurable Portable Test Systems and Methods" by Dinesh Doshi et al.;

Co-pending application Ser. No. 15/236,314 filed Jun. 12, 2016 entitled "Automated Validation And Calibration Portable Test Systems And Methods" by Dinesh Doshi et al.;

Co-pending application Ser. No. 15/236,292 filed Jun. 12, 2016 entitled "Cloud-Based Services For Management Of Cell-Based Test Systems" by Dinesh Doshi et al.; and Co-pending application Ser. No. 15/236,277 filed Jun. 12, 2016 entitled Device Profile-Driven Automation For Cell-Based Test Systems by Dinesh Doshi et al.

FIELD OF THE INVENTION

Embodiments of the present invention relate to the field of device testing.

BACKGROUND

Numerous electronic technologies such as digital computers, video equipment, and telephone systems have facilitated increased productivity and reduced costs in processing information in most areas of business, science, and entertainment. More and more the components used in these activities interact with a network (e.g., the internet, the cloud, etc.). The number of electronic devices used in these activities is growing rapidly, with new versions and new types of devices with diverse capabilities being continuously and rapidly introduced. Thorough testing of the devices under many different scenarios is important to make sure the devices will function correctly. Providing proper testing environments is often critical to achieving accurate test results. However, when the devices are interacting with very large networks beyond the control of the tester it is difficult to ensure accurate test results.

Traditional attempts at testing devices that communicate with large networks often involve trying to simulate the large communication network. This typically involves significant resources. The traditional approaches are typically implemented in a large stationary facility or room with lots of costly equipment attempting to simulate the large communication network. In addition, providing radio frequency interference mitigation for the large facilities is also typically very expensive and involving numerous individual different test devices in a large shielded room (e.g., oscilloscopes, voltmeters, etc.). These large facilities often require significant manual interaction and supervision to accurately test a device. Each different type of device under test often involves a complete reset and reconfiguration of the large facility. It is also usually inconvenient and disruptive for ongoing field operations to ship products to a single facility for testing. Traditional attempts to automate some aspects of the testing are typically limited. Conventional approaches typically require significant manual support for various activities such as configuring the test environment, equipment maintenance, test case delivery, device profile delivery, test data collection, data analytics and reporting, and consulting, for example. These factors contribute significantly to the cost of traditional device testing.

SUMMARY

In one embodiment, a test system comprises: a network access point simulation component configured to simulate network access point operations and to simulate test interactions with user equipment, and a local control component configured to direct the network access point simulation component and to control test interactions with the user equipment. The number of devices under test included in the user equipment and distinct network access points that are coincidentally simulated are variable. In one exemplary implementation, the local control component comprises a test executive operable to direct simulation of communication network operations and the test interactions in accordance with information received from the remote control components. The network access point simulation component and local control component are portable.

The simulation of network communication interactions can correspond to various different implementations (e.g., small cell operations, EnodeB operations, evolved packet core (EPC) operations etc). The test system can be configured to operate in a variety of implementations (e.g., a single device under test, a plurality of devices under test, a single network access point is simulated, a plurality of network access points are simulated, etc.). In one embodiment, a test box is communicatively coupled to the network access point simulation component. The test box comprises a material operable to shield contents of the test box from electromagnetic radiation interference, wherein contents of the test box includes at least one of the devices under test.

In one embodiment, the network access point simulation component is a cellular network access point simulation component configured to simulate cellular network access point operations. The local control component directs simulation of cellular communication network operations and the test interactions in accordance with information received from the remote control components. The simulation of cellular communication network operations can correspond to a complete set or substantially complete set of network communication operations that a device under test may participate in when operating in a normal non-test environment. The simulated network communication interactions can correspond to a reduced set of communication network operations that are less than a complete set of operations that a device under test may participate in when operating in a normal non-test environment. In one exemplary implementation, the cellular network access point simulation component comprises a small cell network access point, the simulated cellular network communication operations correspond to EnodeB operations, an EPC operations, and application server operations.

In one embodiment, a test method comprises: configuring a test system to perform simulated network communication interactions with user equipment, generating test information to test the user equipment, and testing the user equipment in accordance with the test information. The number of devices under test in the user equipment and the number of network access points involved in the network communication interactions is variable. The test information is communicated to the user equipment via the simulated network communication interactions. The simulated network communication interactions can correspond to a reduced set of operations that are less than a complete set of operations in a normal non-test environment. The simulated network communication interactions can correspond to various different operations, (e.g., small cell operations, EnodeB operations, etc.). A plurality of devices under test can be tested at least in part in parallel. A plurality of network access points can be simulated at least in part in parallel. The number of distinct network access points that are coincidentally simulated is programmable. The configuring can include implementing an EPC and at least a portion of an application server, including generating test control signals. Generating test information can be performed locally. The test information generation can include downloading test management control instructions from a remote network automatically.

DESCRIPTION OF THE DRAWINGS

The accompanying drawings, which are incorporated in and form a part of this specification, are included for exemplary illustration of the principles of the present invention and not intended to limit the present invention to the particular implementations illustrated therein. The drawings are not to scale unless otherwise specifically indicated.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Efficient and effective flexible test systems and methods are presented. In one embodiment, a test system is readily adaptable to a variety of configurations. The configurations can be automatically implemented locally and can be based on a large reservoir or database of test information stored and managed remotely. The test systems can be automatically configured to simulate network communication interactions that correspond to various different implementations (e.g., small cell operations, EnodeB operations, evolved packet core (EPC) operations etc). The test systems can be configured to operate in a variety of implementations (e.g., various different types of devices under test, a single device under test, a plurality of devices under test, a single network access point is simulated, a plurality of network access points are simulated, etc.). The test systems are portable and can be conveniently deployed in local environments.

The local test systems and methods facilitate easily implemented convenient local testing of various user equipment. The local test systems and methods can be portable and easy to use, unlike traditional test systems. Unlike conventional test approaches that typically have a number of limitations, traditional testing approaches usually have very cumbersome and complicated test equipment and configuration procedures that consume significant resources to implement and maintain. Even though traditional approaches consume significant resources, the testing capabilities of the traditional testing approaches are also usually limited. For example, the configuration of UE to eNodeB and EPCs (e.g., one to one, one to multiple, and multiple to multiple, etc.) are typically limited or not possible in traditional approaches. A number of traditional test systems and method are also typically directed to limited types of devices that are tested. Local test systems and methods are easily adaptable to and configurable for different UE devices under test. Traditional approaches do not even typically attempt this flexibility and scalability due to the cost of the traditional resources and daunting traditional configuration issues. In a local test system and method, the local test system components have reasonable costs to implement and the automated configuration can be substantially effortless from a user's perspective.

Figure 1:
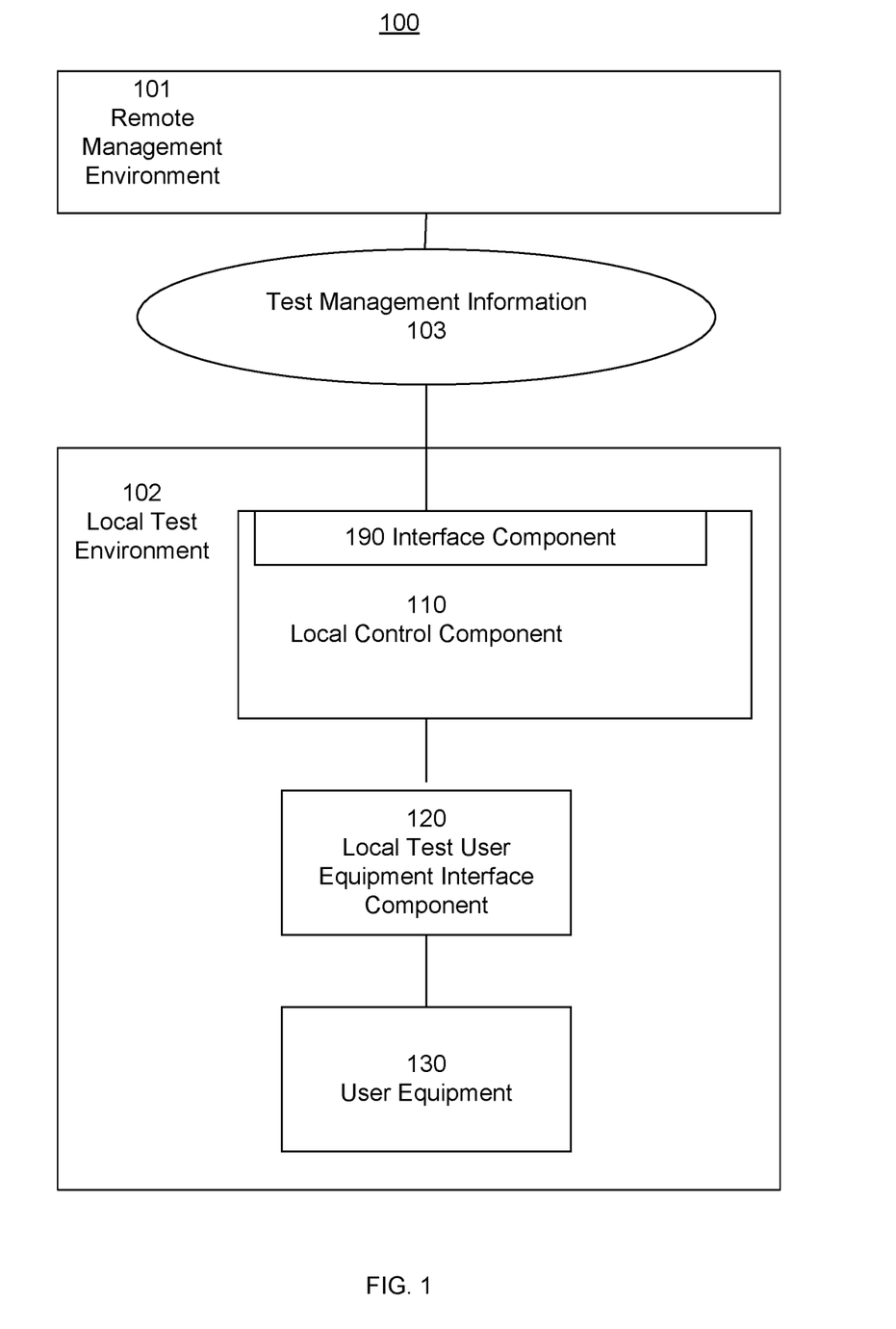
FIG. 1 is a block diagram of an exemplary test system in accordance with one embodiment.

FIG. 1 is a block diagram of an exemplary test system 100 in accordance with one embodiment. Test system 100 includes a remote management environment 101 and a local test environment 102. The local test environment 101 includes local control component 110 and local test user equipment interface component 120. In one embodiment, the test system is configured to test user equipment 130. Local control component 110 is configured to direct the local test user equipment interface component 120 and to control test interactions with the user equipment 130. The local test user equipment interface component 120 is operable to communicate with the user equipment 130 during test operations. In one exemplary implementation, the local test user interface component 120 and local control component 110 are portable.

In one embodiment, the local test user equipment interface 120 is configured to simulate various communication characteristics and features (e.g., communications in accordance with a communication infrastructure component, protocol, network, architecture, etc.). The local test user equipment interface 120 can include communications mechanisms compatible with various different types of communication links for communicating with the user equipment 130. The communication links can include wireless communication links (e.g., cellular, WiFi, small cell, etc.), wired communication links (e.g., coaxial radio frequency (RF) link, Ethernet, universal serial bus (USB), etc.), or combinations of different types of communication links.

It is also appreciated that user equipment (UE) can include a variety of different devices under test. The devices under test may provide end users with many different capabilities (e.g., cell phones, computers, tablets, laptops, devices in the Internet-of-things (IoT), etc.). The user equipment can include the capability to collect and exchange data among themselves and with other devices over a network. The user equipment can communicate over networks through a wired or wireless medium or communication link using different types of network protocols, such as but not limited to the 3rd Generation Partnership Project (3GPP) Long-Term Evolution (LTE) standard.

In one embodiment, local control component 110 includes an interface component 190 configured to communicate management information. Interface component 190 can be configured to communicate management information from a variety of sources and received via a variety of mechanisms. The mechanism for delivery of management information can be an external network communication connection to a component external to the local test environment, an internal communication connection to another internal test environment management component, and so on. In FIG. 1 the source of the management information is a remote management environment (e.g., test management services received from the cloud, a remote site, etc.). In another embodiment, the source of the management information is a from local test management related resource. In one exemplary implementation, the management information communicated via a network to the local test system environment. In one exemplary, implementation the management information is loaded onto a storage or hardware device (e.g., a jump drive, other flash storage mechanism, DVD, etc.) at a remote location and the storage device is transported to a local test environment where the management information is downloaded from the portable storage device to a component in the local test environment (e.g., local control component 110, local test user equipment interface component 120, etc.).

In one embodiment, local control component 110 can communicate with a remote component via a real network in the remote environment 101. In one embodiment, the real network (e.g., the Web, the internet, the Cloud, etc.) is a "real" network for communicating information in a normal mode as opposed to being part of a "simulated" network used for testing. The remote component can be a server that provides various testing related information (e.g., device profile test information, test management information, etc.)

While the above management information communications and remote management environment interactions are described as flowing to the local test environment, it is appreciated the local test environment can forward information in the opposite direction. In one embodiment, the local test environment can forward information externally through similar communication mechanisms (e.g., via a communication network, via physical transportation of portable storage devices, etc.). The information can be communicated to a remote management environment.

In one embodiment, configuration of a local test system is automated. The local test system can include the local control component 110 and local test user equipment interface 120. The configuration can be based upon information received from the remote management environment 101. The configuration can be similar to automated configuration described in Ser. No. 15/236,315 entitled "Automated Configurable Portable Test Systems And Methods" by Dinesh Doshi Et Al., which is incorporated herein by reference. In one exemplary implementation, the configuration of local control component 110 and local test user equipment interface 120 is performed with little or no local manual interaction. The remote management environments 101 can be similar to remote management environments described in Ser. No. 15/236,292 entitled "Cloud-Based Services For Management Of Cell-Based Test Systems" by Dinesh Doshi et al.; which is incorporated herein by reference. In one exemplary implementation, the configuration of local control component 110 and local test user equipment interface 120 is performed with little or no local manual interaction.

Test system 100 is compatible with simulating various communication network environments or architectures for communicating with the user equipment 130. In one exemplary implementation, the local test user interface component 120 is a network access point simulation component configured to simulate network access point operations. The local control component 110 can simulate a network communication core. The components of the test system can be automatically configured. The configuration of the test environment topology is also flexible. The user equipment can comprise a single device under test or a plurality of devices under test. The number of devices under test and distinct interfaces or network access points that are coincidentally simulated is variable. A single network access point can be simulated or a plurality of network access points can be simulated.

In one embodiment, with respect to a local test side of a local testing environment or local test communications, the local test systems and methods are dedicated to performing test operations on the user equipment in the local test environment. The local test system may engage in normal communication operations on a normal environment side, but keeps these communications separate from the communications with the UE devices under test in order to maintain the integrity and control of the testing environment. In one exemplary implementation, test interfaces that communicate with devices under test are dedicated to testing operations. The local and dedicated aspects of the local test systems and methods facilitate maintenance of testing environment integrity control, unlike some traditional testing approaches that try to "piggy back" or utilized (in whole or in part) network communication components in the testing side communications that are also used for normal communications. Traditional systems that attempt to normal communication components on the testing side of a test environment typically have a high probability of losing or diminishing testing environment integrity control. For example, traditional testing approaches that attempt to utilize a communication network that is primarily used for normal communications is usually subject to potential interference or loss of testing environment control.

In one embodiment, local test systems and methods isolate test side network communications from normal side network communications. In one exemplary implementation, the local test systems and methods prevent or substantially reduce interference from normal side network operations.

Figure 2:
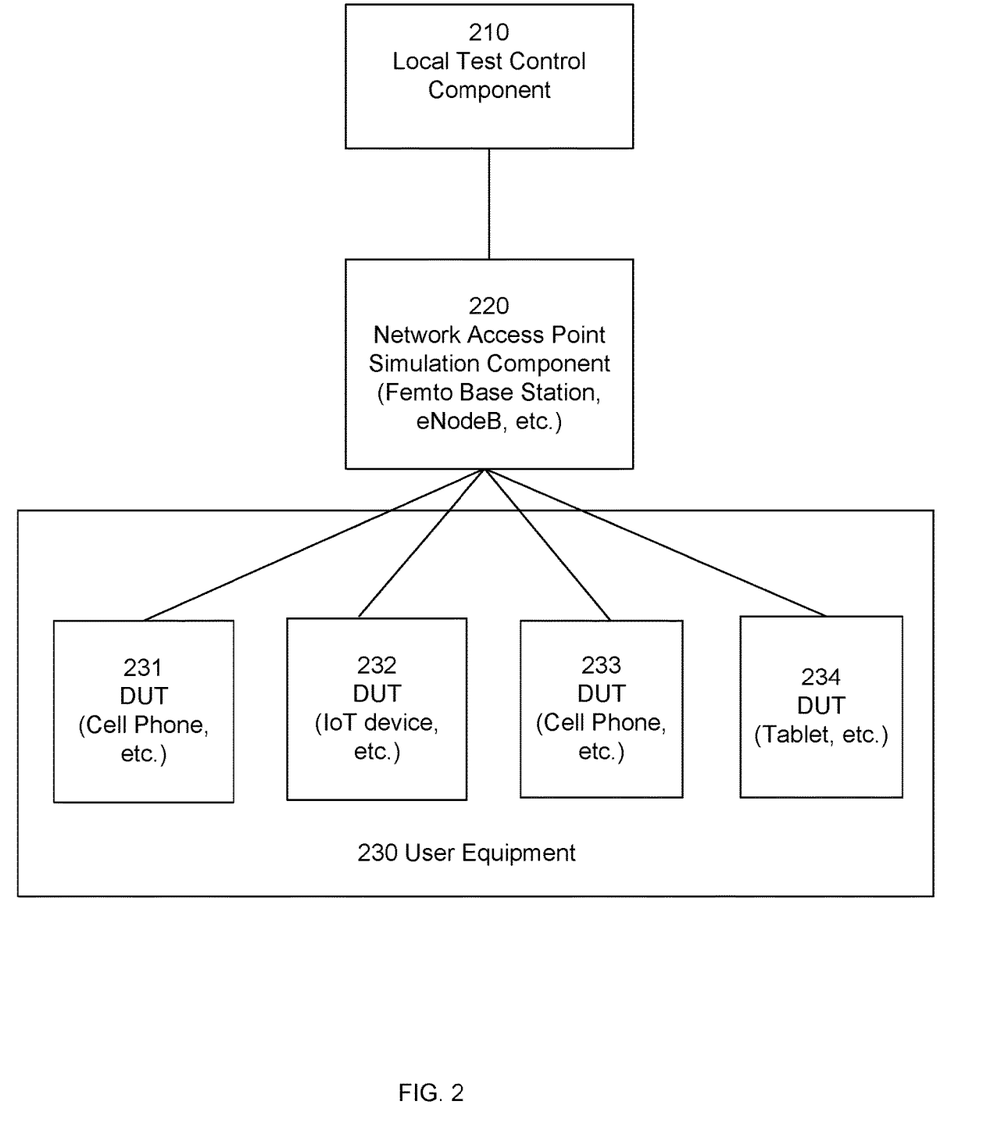
FIG. 2 is a block diagram of an exemplary test system with multiple devices under test in accordance with one embodiment.

FIG. 2 is a block diagram of an exemplary test system with multiple devices under test in accordance with one embodiment. The test system includes local control component 210 and network access point simulation component 220. Network access point simulation component 120 can simulate various different network access points (e.g., small cell Base Station, eNodeB, etc.). The test system in this implementation is configured to test user equipment 230 which includes devices under test 231, 232, 233, and 234. The devices under test can be a cell phone, IoT device, a tablet, and so on.

Figure 3:
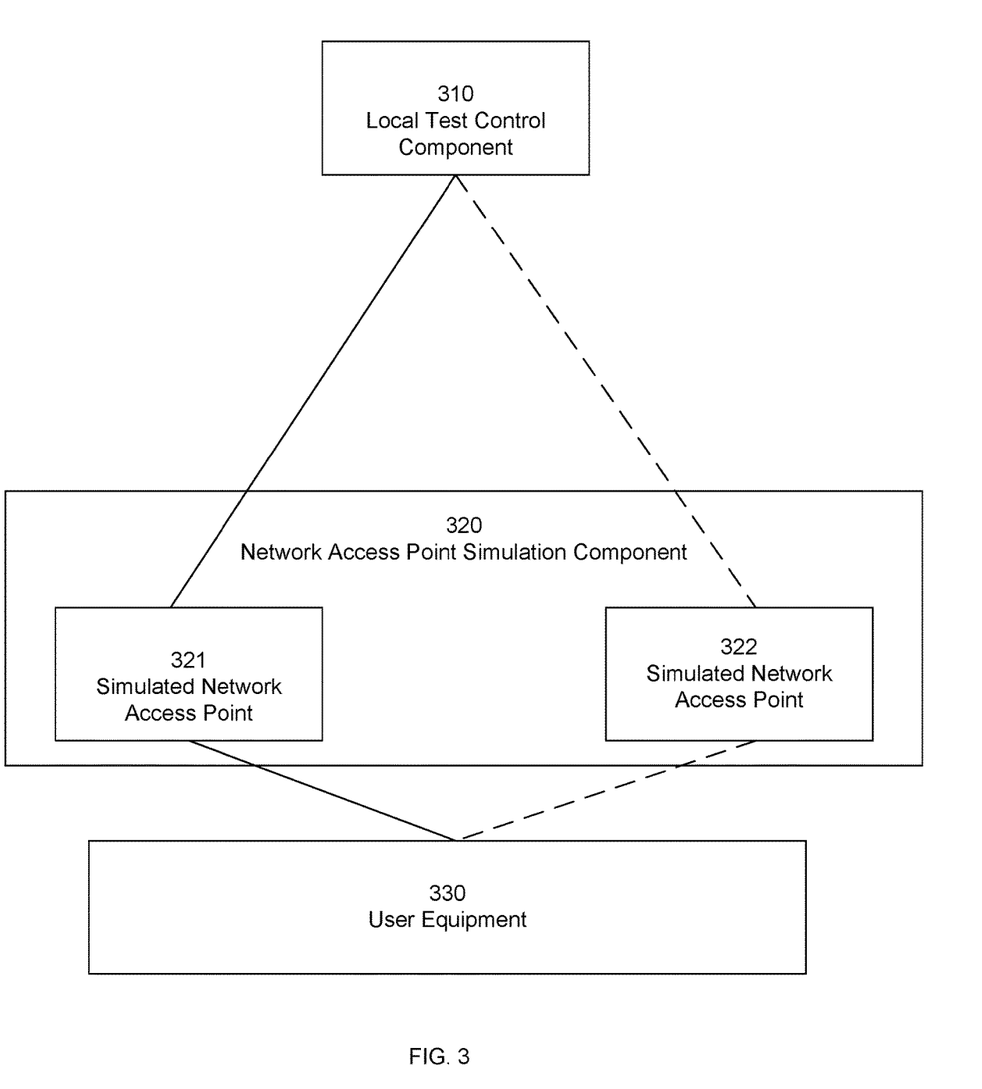
FIG. 3 is a block diagram of an exemplary test system with multiple network access point simulators in accordance with one embodiment.

FIG. 3 is a block diagram of an exemplary test system with multiple network access point simulators in accordance with one embodiment. The test system includes local control component 310 and network access point simulation component 320 which can simulated network access points 321 and 322. The test system in this implementation is configured to test user equipment 330. Again, it is appreciated the test user equipment 330 can include a single device under test or a plurality of devices under test. In one exemplary implementation, if a single device is under test then only one network access point is simulated and if a plurality of devices are under test then the both network access points simulations can be used.

Figure 4:
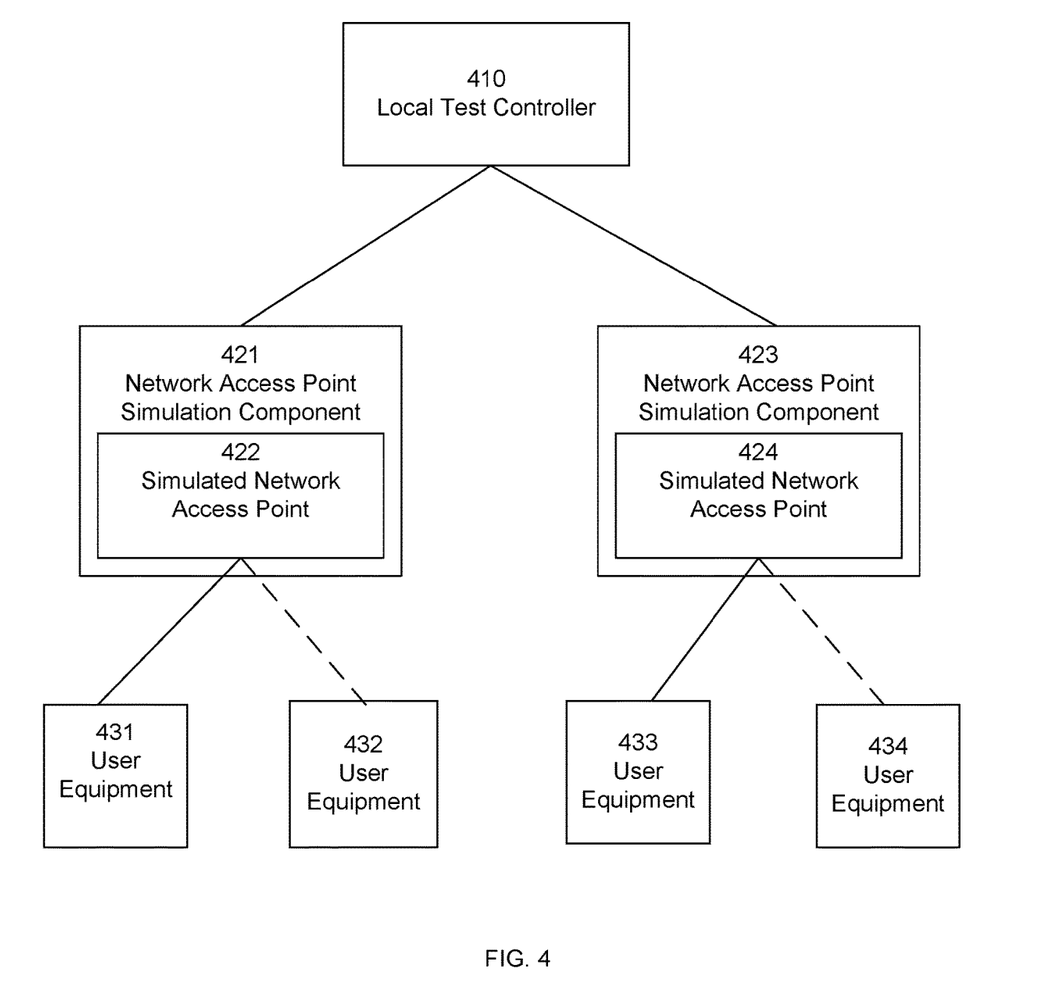
FIG. 4 is a block diagram of an exemplary test system with multiple network access point simulators and multiple devices under test in accordance with one embodiment.

FIG. 4 is a block diagram of an exemplary test system with multiple network access point simulation components and multiple devices under test in accordance with one embodiment. The test system includes local control component 410 and network access point simulation components 421 and 423. Network access point simulation components 421 simulates network access point 422 and network access point simulation components 423 simulates network access point 424. Simulated network access point 421 is configured to communicate test information with either user equipment 431 or 432. Simulated network access point 422 is configured to communicate test information with either user equipment 433 or 434. The two simulated network access point simulators 422 and 423 can communicate test information substantially in parallel on at least one of the respective user devices communicatively coupled to the respective network access point simulation components 421 and 423. In one exemplary implementation, network access point simulation component 421 can run tests on user equipment 431 at least in part in parallel or coincidentally to network access point simulation component 423 running tests on user equipment 433.

Figure 5:
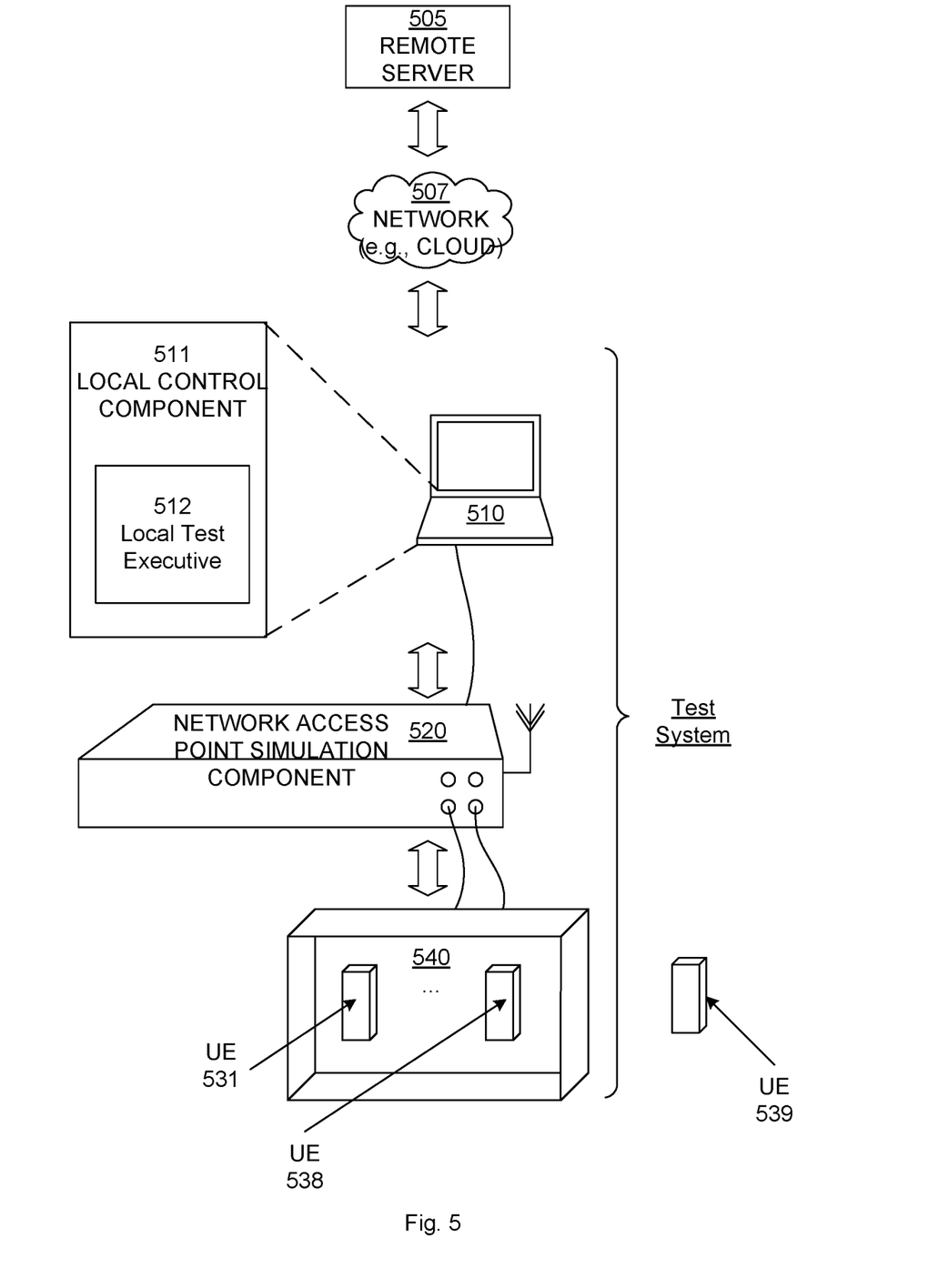
FIG. 5 is a block diagram of an exemplary test system in accordance with an embodiment.

FIG. 5 is a block diagram of an exemplary test system in accordance with an embodiment. The test system includes one or more local control components 511 implemented on computer system 510 and one or more network access point simulation component 520. In one embodiment, the test system includes test box 540. Network access point simulation component 520 can communicatively couple with the user equipment or devices under test 531 through 539. The network access point simulation component 520 can have both wired and wireless connections to connect to the user equipment 531 through 539. In one embodiment, the network access point simulation component simulates a base station. The base station may be implemented as a small cell. The network access point simulation component can simulate an LTE Evolved Node B (eNodeB). It is appreciated that a local test system can test various aspects of device interactions with a communication network. The local test system can test interactions between multiple UE devices under test via a simulated communications network. The local test system can test communication interactions as a UE device under test switches communications from one cell to another cell.

In one embodiment, a small cell is a network access node that utilizes relatively low power radio communications with a limited range. In one exemplary implementation, the range is between approximately 10 meters and up to approximately 2 kilometers. A small cell can be a femtocell, a picocell, a microcell and so on. The small cell can include a wide range of interfaces (e.g., GSM, LTE interfaces including eNodeB, other 3GPP interfaces, CDMA 2000, W-CDMA, LTE, Wi-Fi, TD-SCDMA, etc.).

The local test control component 511 can include local test executive 512. In an embodiment, the local control component 511 is implemented as a virtual machine on the computer system 510. The local test executive 512 can be used for test automation, including test equipment configuration automation and test case execution automation. In one embodiment, the local test executive is operable to analyze and present (e.g., display, report, etc.) test results locally. In one embodiment, the portions of a network (e.g., network control plane, user plane, EPC components, etc.) can be simulated by portions of a test executive on separate computer systems instead of the single computer system 510.

In one embodiment, the local test executive 511 simulates a communication network core. In one exemplary implementation, the network core is a simulated Evolved Packet Core (EPC), also known as a System Architecture Evolution (SAE) Core. The simulated EPC can be used for testing voice-and-data devices (e.g., smartphones) and operates in accordance with contemporary standard(s) appropriate for the type of user equipment being tested, such as the 3rd Generation Partnership Project (3GPP) Long-Term Evolution (LTE) standard. A communication network core that interfaces with non-3GPP systems such as WiFi™, WIMAX (Worldwide Interoperability for Microwave Access), and CDMA2000 can also be simulated computer system 510 by the local test executive 512. In one exemplary implementation, the test executive 512 simulates an Internet Protocol (IP) Multimedia Subsystem or IP Multimedia Core Network Subsystem (IMS) server as described by 3GPP.

The computer system can communicate with (is communicatively coupled to) a remote management environment. The remote management environment can include resources to enable and facilitate use of cloud-based services to manage the local test system. In one embodiment, the computer system 510 communicates with remote servers 505 via the network 507. The local test executive 512 implemented on computer system 510 can also direct collecting and reporting of test results to the server 505.

As noted above, a cell-based test system can include one or more simulated network access points (e.g., one or more base stations, eNodeBs, etc.). Configurations in which multiple base stations are connected to one simulated network control plane (e.g., EPC) and in which one base station is connected to one network control plane simulator (e.g., EPC) are supported.

In one embodiment, the base station 520 communicates with the network control plane simulator (e.g., the EPC) via an Ethernet connection. The simulated network can be operated in an ordinary test mode (e.g., to support testing of ordinary or normal call flow) or in an error injected test mode in which error conditions from the network side may be intentionally injected, depending on the requirements of the test cases.

One or more items of user equipment (UEs) 531-539 can be communicatively coupled (wired or wirelessly) to each simulated network access point in the test system. In one embodiment, there are 32 UEs coupled to each simulated network access point. In one embodiment, the user equipment to be tested is placed inside a shielded test box 540. Like the other elements of the test system the test box 540 is portable. For example, the test box 540 can be about 24 by 24 by 24 inches in size. The test box 540 may be referred to herein as a portable test unit.

Figure 6:
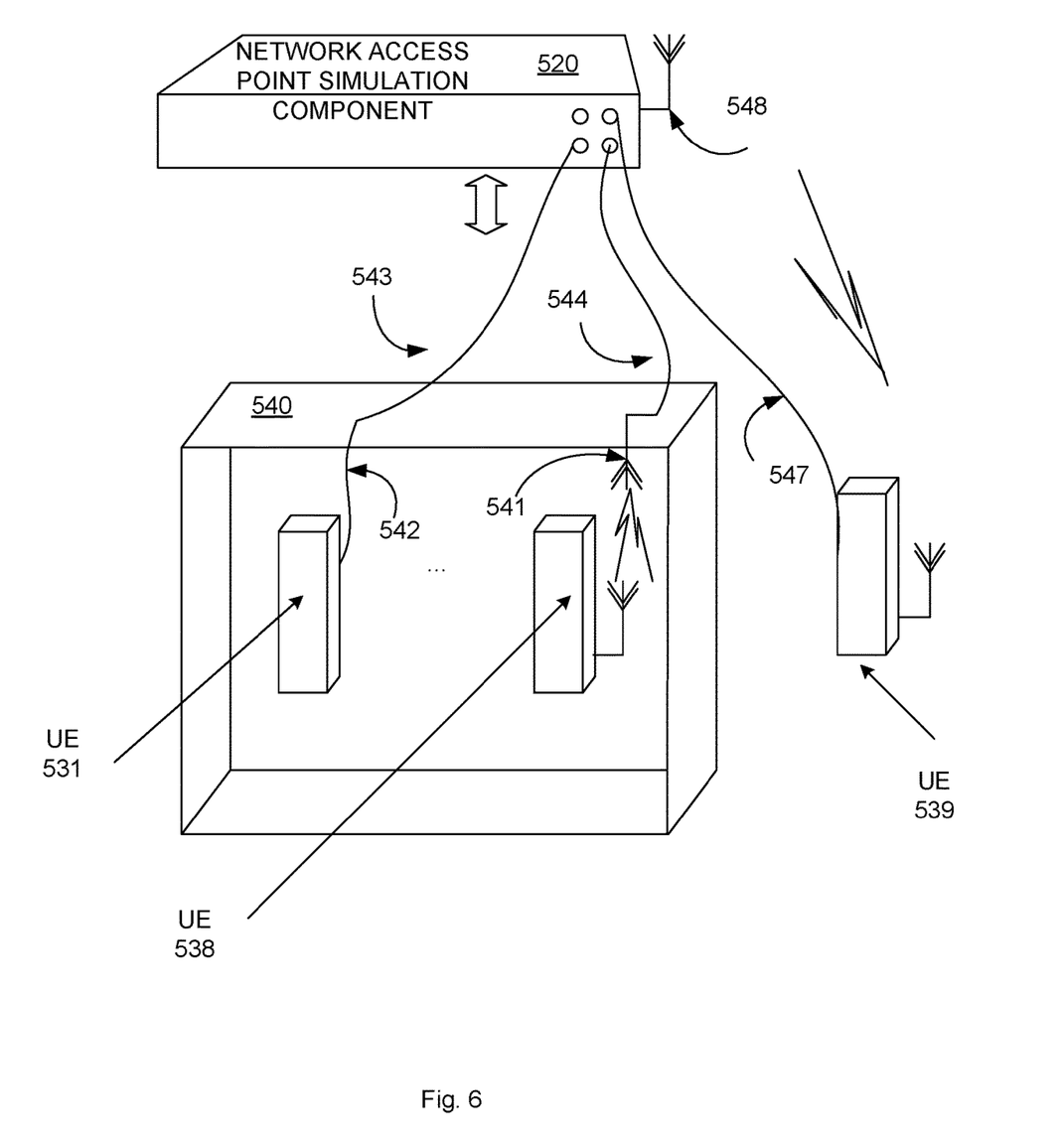
FIG. 6 is a block diagram of an exemplary shielded box in accordance with one embodiment.

FIG. 6 is a block diagram of an exemplary test box 540 in accordance with one embodiment. The test box is communicatively coupled to the network access point simulation component 520, wherein the test box 540 comprises material operable to shield contents of the test box from electromagnetic radiation interference. The contents of the test box 540 can include at least one of the devices under test (e.g., UE 531, UE 538, etc.). The test box 540 can include various internal connection interfaces for communicatively coupling user equipment and devices under test with external interfaces of the test box 540. A test box 540 internal connection interface can include an internal antenna 541 that is coupled to wired connection 544 to network access point simulation component 520. The internal antenna 541 allows wireless communications (e.g., radio frequency (RF) signals, etc.) to pass back-and-forth between network access point simulation component 520 and the user equipment (e.g., 531, 538, etc.) inside the shielded box. A test box 540 internal connection interface can also include pass-through connectors (e.g., Universal Serial Bus connectors, coaxial connectors, etc.) that allow the network access point simulation component 520 to communicate with the user equipment (e.g., 531, 538, etc.) in the shielded box using a wired configuration (e.g., cables 543 and 542, etc.). Wired connectors in the shielded box 540 can also be used to connect power cables to the user equipment 531-538 inside the shielded box. The network access point simulation component 520 can also communicate with user equipment (e.g. UE 539, etc.) that is outside the test box 540 via a wired connection (e.g., 547. etc.) or a wireless connection (e.g., via antenna 548, etc.). A test box 540 external connection interface can also include wired connectors (e.g., Universal Serial Bus connectors, coaxial RF connectors, etc.) for coupling to wired connections (e.g., cables 543 and 544, etc.).

The UE (which also may be referred to as devices under test) can various different types of devices, including telecommunication devices (e.g., smartphones, tablets, etc.) and Internet-of-things (IoT) devices (e.g., sensors and meters). The IoT devices can be devices utilized in utility applications (e.g., water, gas or electricity activities including generation and consumption management, metering, smart distribution or grid technology, etc.), asset management applications (e.g., facility management applications (e.g., fire and safety, security, heating ventilating and air conditioning (HVAC), lighting, etc.), appliance applications (e.g., various home or industrial appliance automation, remote control, etc.), health care applications (e.g., monitoring, biometrics, etc.), industrial applications (e.g., controls for pumps, valves, motors, assembly line components, etc.), and so on.

In one embodiment a base station network access point simulation component has a relatively small and portable footprint with Multiple Inputs and Multiple outputs (MIMO). The network access point simulation component is configured to be compatible with IP protocols (e.g., IPv4, IP v6, etc.). The access point simulation component is configured to be compatible a small cell architecture. The transmission power can vary. In one exemplary implementation, the transmission power is in the range of 13 dBm @LTE 20 MHz BW. The UE connection interfaces can be radiated (e.g., wireless, RF, etc.) or conducted (e.g., wired, cable, etc.). The network access point simulation component can support communication with and testing of multiple (e.g., 32, 128, etc.) UE devices under test coincidentally. The communication with and testing of the multiple UE devices can be simultaneous or in parallel. There can also be support for a one eNodeB to on EPC configuration, multiple eNodeB to one EPC configuration coincidentally, multiple eNodeB to multiple EPC configuration coincidentally, and so on. In one exemplary implementation, configurations with multiple eNodeBs or multiple EPCs can provide simultaneous or parallel support for the multiple eNodeBs or multiple EPCs. The base station can include WiFi capabilities.

In one embodiment, in addition to simulating conditions and characteristics found in typical or normal operating situations, local test system and method environments can create conditions and characteristics not usually found in typical or normal operating situations. In standard use cases, eNodeB and EPC are typically limited to supporting a normal call flow. In a local test system and method environment, an eNodeB and EPC may be operated in normal mode or error conditions may be injected. In standard use cases, any changes in the eNodeB and EPC are typically triggered by the UEs that are attached. In a local test system and method environment, changes in the eNodeB and EPC can also be triggered by the local test systems and methods. In a local test system and method environment, multiple eNodeBs are connected to one EPC. In a local test system and method environment, various different configurations of eNodeB and EPC connections can be available (e.g., one to one, one to multiple, multiple to multiple, etc.) The local test system and method environment conditions and characteristics may be based on testing requirements.

Figure 7:
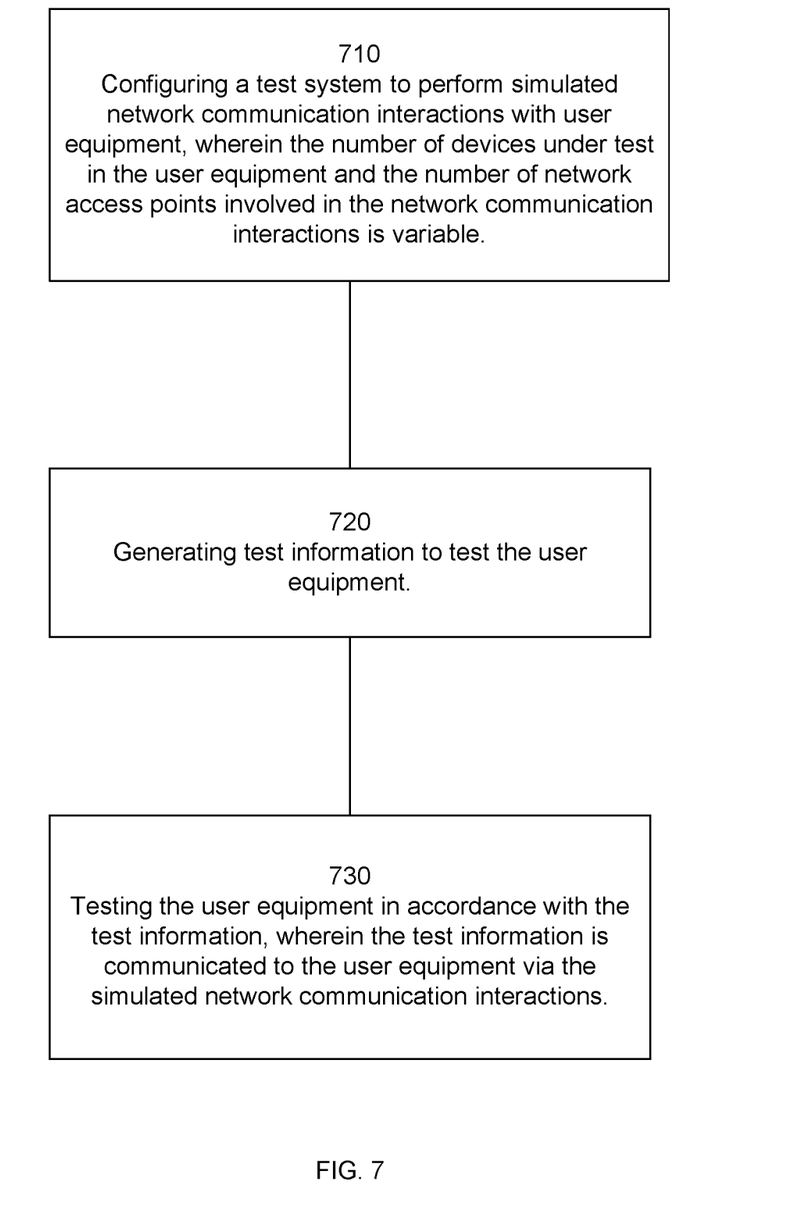
FIG. 7 is a block diagram of an exemplary computer controlled test method in accordance with one embodiment.

FIG. 7 is a block diagram of an exemplary test method in accordance with one embodiment.

In block 710 a test system is configured to perform simulated network communication interactions with user equipment. In one embodiment, the simulated network communication interactions correspond to a complete or substantially complete set of operations that a device under test may participate in when operating in a normal non-test environment. In another embodiment, the simulated network communication interactions correspond to a reduced set of operations that are less than a complete set of operations in a normal non-test environment. The simulated network communication interactions can correspond to various different implementations (e.g., small cell operations, EnodeB operations etc). The configuring includes implementing an EPC and at least a portion of an application server, including generating test control signals.

The number of devices under test in the user equipment and the number of network access points involved in the network communication interactions is variable. A plurality of devices under test can be tested at least in part in parallel. Similarly, a plurality of network access points can be simulated at least in part in parallel. In one embodiment, devices under test in the user equipment and the number of distinct network access points that are coincidentally simulated is programmable.

In block 720, test information to test the user equipment is generated. Generating the test information can be performed locally. In one exemplary implementation, generating test information is performed in accordance in a local control component. The local control component can include a network control plane simulator and a local test and simulator control component. In one embodiment, generating test information includes downloading test management control instructions from a remote network automatically.

In block 730, the user equipment is tested in accordance with the test information generated in block 720. The test information is communicated to the user equipment via the network communication interactions with the user equipment.

In one embodiment, a local test system can perform various different UE tests. In one exemplary implementation, the tests are categorized in a hierarchy including operator tests, industry tests, and custom tests. The operator tests can include, LTE Device UICC (USIM, ISIM) Interaction testing, LTE SMS testing, LTE AT command testing in a Test Automation Test plan, LTE IMS registration and IMS registration retry testing, LTE 3GPP band 13 supplementary signaling conformance testing, LTE data retry testing, RCS testing, and so on. The industry tests can include GSMA IoT testing such as IoT deuce application test cases, communications module test cases (e.g., IPv4 test case, IPv6 test case, etc.) fast dormancy test case, security test cases, subscription identifier test cases, connection efficiency test cases, radio policy manager test cases, and so on. The custom tests can include IoT performance characterization testing such as embedded IoT data throughput testing, IoT characterization and interrupt scenario testing, IoT application retry testing (e.g., indentifying offending device applications, characterize the retry traffic from the DUT to the service, vary RF, IP and environment between normal and exception, system controlled scenarios verifying behavior, etc.).

Figure 8:
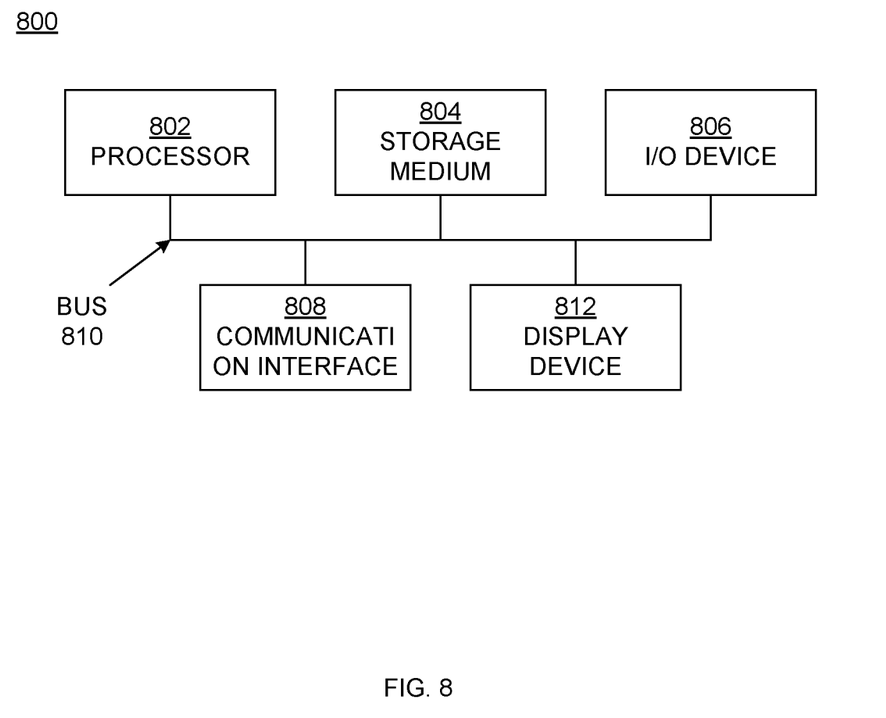
FIG. 8 is a block diagram illustrating elements of a computer system in accordance with one embodiment.

FIG. 8 is a block diagram illustrating elements of a computer system 800 in accordance with one embodiment. In an embodiment, the computer system 800 represents a platform for implementing the computer system 510 of FIG. 5.

The computer system 800 broadly includes any single or multi-processor computing device or system capable of executing computer-readable instructions. In its most basic configuration, the computer system 800 may include at least one processing circuit (processor) 802 and at least one storage medium 804. The processor 802 generally represents any type or form of processing unit or circuit capable of processing data or interpreting and executing instructions. In an embodiment, the processor 802 receives instructions from a software application or module. The storage medium 804 generally represents any type or form of volatile or non-volatile storage device or medium capable of storing data and/or other computer-readable instructions.

The computer system 800 may also include one or more components or elements in addition to the processor 802 and storage medium 804. For example, the computer system 800 may include an input/output (I/O) device 806, such as a keyboard and mouse, and a communication interface 808, each of which may be interconnected via a communication infrastructure (e.g., a bus 810). The computer system 800 may also include a display device 812.

The communication interface 808 may be any type or form of communication device or adapter capable of facilitating communication between the computer system 800 and one or more other devices including a network of other devices. The communication interface 808 can include, for example, a receiver and a transmitter that can be used to receive and transmit information (wired or wirelessly).

Automated testing is flexibly scalable to large numbers of different devices and can be accomplished quicker, more systematically, and at less expense than, for example, manual testing. This is turn can increase test coverage, scalability and reliability while reducing time-to-market, and the cost to both manufacturers and consumers.

Some portions of the detailed descriptions are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical or quantum computing device) that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as suited to the particular use contemplated. It is intended that the scope of the invention be defined by the Claims appended hereto and their equivalents. The listing of steps within method claims do not imply any particular order to performing the steps, unless explicitly stated in the claim.

What is claimed is:

1. A test system comprising:
    a network access point simulation component configured to simulate communication network access point operations comprising test interactions with user equipment, wherein a number of devices under test included in the user equipment and distinct network access points that are coincidentally simulated are variable; and
    a local control component configured to direct the network access point simulation component and to control the test interactions with the user equipment, wherein the local control component comprises a test executive operable to direct simulation of communication network operations and the test interactions in accordance with information received from remote control components, wherein the network access point simulation component and local control component are portable.

2. A test system of claim 1, wherein the simulated network access point operations are small cell operations.

3. A test system of claim 1 wherein the simulation of communication network operations comprises simulated evolved packet core (EPC) operations and the simulated network access point is a simulated evolved node B (eNodeB) component.

4. The test system of claim 1 wherein the user equipment comprises a single device under test.

5. The test system of claim 1 wherein the user equipment comprises a plurality of devices under test.

6. The test system of claim 1 wherein a single network access point is simulated.

7. The test system of claim 1 wherein a plurality of network access points are simulated.

8. The test system of claim 1 further comprising a test box communicatively coupled to the network access point simulation component, wherein the test box comprises material operable to shield contents of the test box from electromagnetic radiation interference, wherein contents of the test box comprises at least one of the devices under test.

9. A test method comprising:
   configuring a test system to perform simulated network communication interactions with user equipment, wherein a number of devices under test in the user equipment and a number of network access points involved in the network communication interactions are variable;
   generating test information to test the user equipment, including test instructions; and
   testing the user equipment in accordance with the test information, wherein the test information is communicated to the user equipment via the simulated network communication interactions and the test instructions are selectively configurable for different user equipment.

10. The test system of claim 9, wherein the simulated network communication interactions correspond to a complete set of operations that a device under test may participate in when operating in a normal non-test environment.

11. The test system of claim 9, wherein the simulated network communication interactions correspond to a reduced set of operations that are less than a complete set of operations in a normal non-test environment.

12. The test method of claim 9, wherein a plurality of devices under test are tested at least in part in parallel.

13. The test method of claim 9, wherein a plurality of network access points are simulated at least in part in parallel.

14. The test method of claim 9, wherein the network access points are small cell network access points, the simulated network communication interactions correspond to EnodeB operations, and the configuring comprises simulating an EPC and at least a portion of an application server.

15. The test system of claim 9, wherein the generating test information is based on test management control instructions received from a remote network automatically.

16. A test system comprising:
    a cellular network access point simulation component configured to simulate cellular communication network access point operations comprising test interactions with user equipment, wherein a number of devices under test included in the user equipment and distinct cellular network access points that are coincidentally simulated are variable; and
    a local control component configured to direct the cellular network access point simulation component and to control the test interactions with the user equipment, wherein the local control component comprises a test executive operable to direct simulation of cellular communication network operations and the test interactions in accordance with information received from remote control components.

17. The test system of claim 16, wherein the simulation of cellular communication network operations correspond to a complete set of network communication operations that a device under test may participate in when operating in a normal non-test environment.

18. The test system of claim 16, wherein the simulated network communication interactions correspond to a reduced set of communication network operations that are less than a complete set of operations that a device under test may participate in when operating in a normal non-test environment.

19. The test system of claim 16, wherein the cellular network access point simulation component comprises a small cell network access point, the simulated cellular network communication operations correspond to EnodeB operations, an EPC operations, and application server operations.

* * * * *